May 23, 1939.    G. T. DOWNEY    2,159,845
FUEL COCK ASSEMBLY
Filed June 28, 1938    2 Sheets-Sheet 1
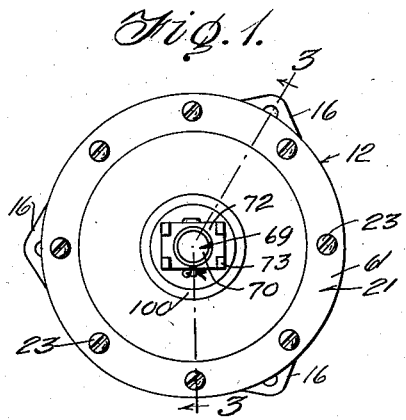
Fig. 1.
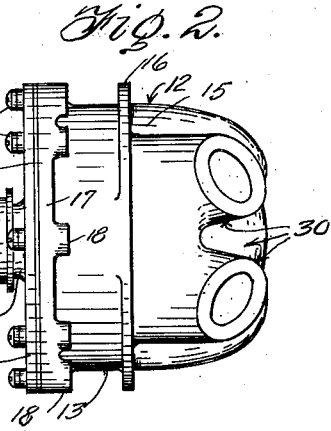
Fig. 2.
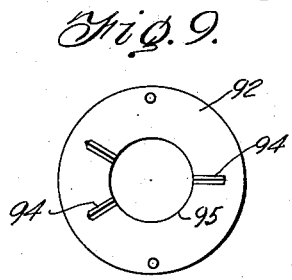
Fig. 9.
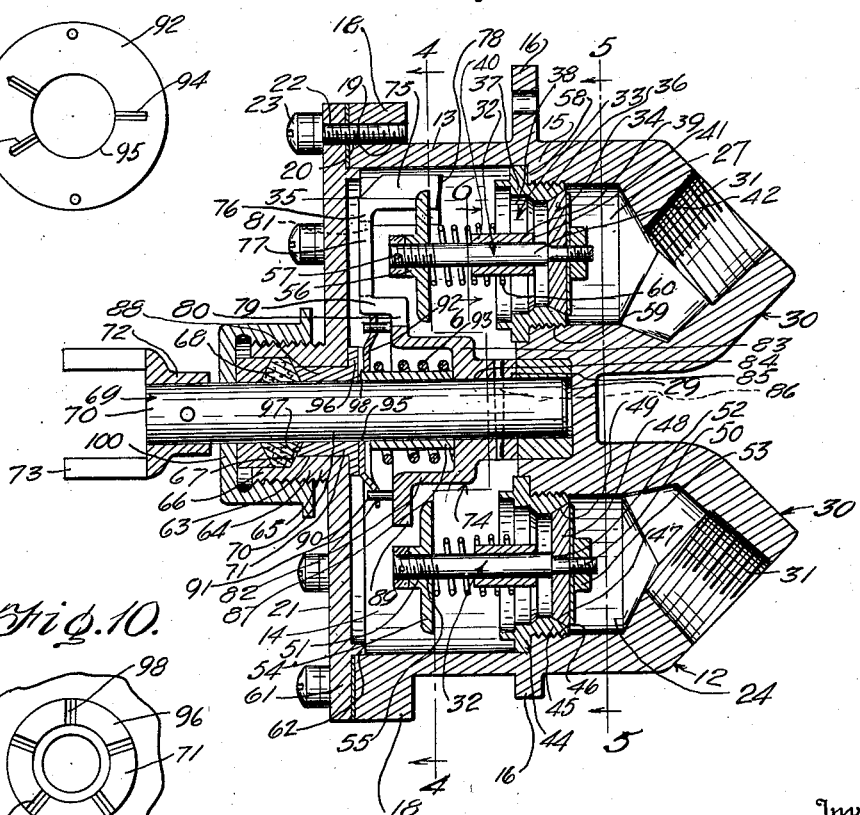
Fig. 3.
Fig. 10.
Inventor
GEORGE T. DOWNEY,
By Kimmel & Crowell,
Attorneys.

May 23, 1939.  G. T. DOWNEY  2,159,845
FUEL COCK ASSEMBLY
Filed June 28, 1938  2 Sheets-Sheet 2
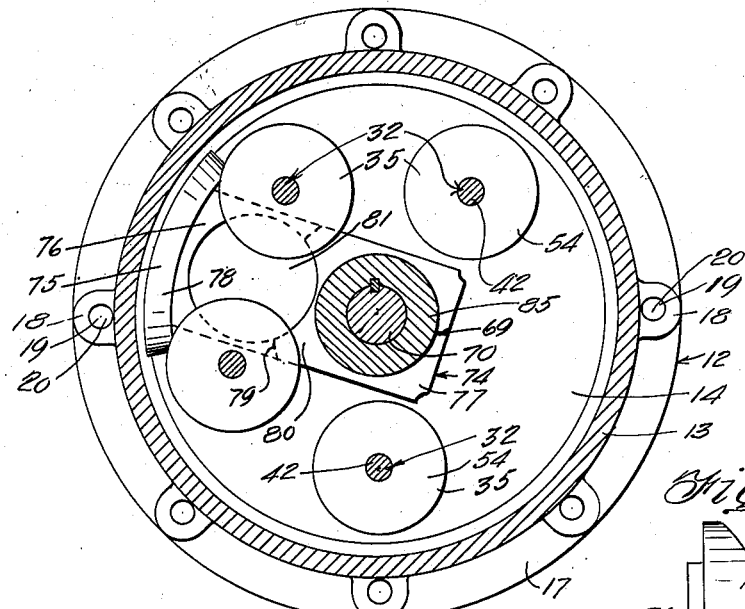
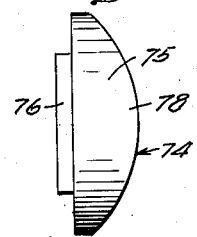
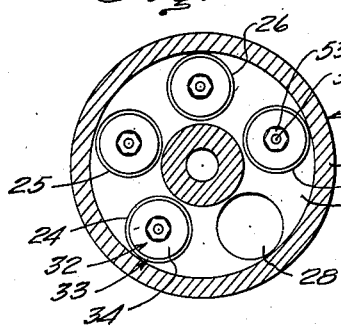
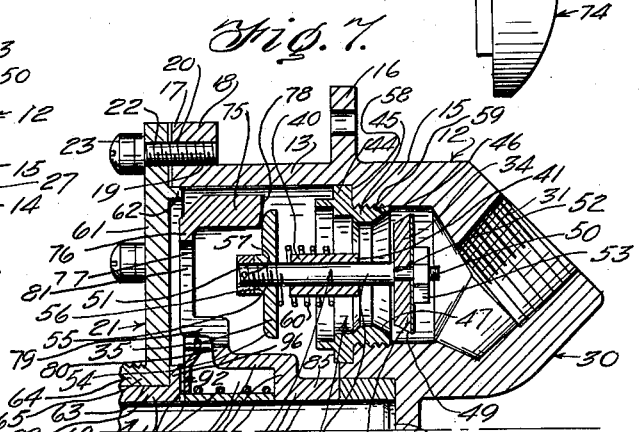
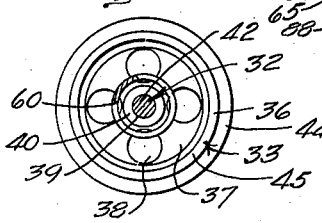
Inventor
GEORGE T. DOWNEY,
By Kimmel & Crowell,
Attorneys.

Patented May 23, 1939

2,159,845

UNITED STATES PATENT OFFICE 2,159,845

FUEL COCK ASSEMBLY

George T. Downey, Corry, Pa., assignor to Aero Supply Mfg. Co. Inc., Corry, Pa.

Application June 28, 1938, Serial No. 216,412

6 Claims. (Cl. 277—20)

This invention relates to a fuel cock assembly designed primarily for use in controlling the fuel supply for internal combustion motors employed on aeroplanes, but it is to be understood that the assembly, in accordance with this invention is for employment in any connection for which it may be found applicable.

The invention aims to provide, in a manner as hereinafter set forth, a fuel cock assembly common to a plurality of independent fuel sources.

The invention further aims to provide a fuel cock assembly common to a series of independent fuel sources, and capable of selectively establishing communication between the motors and one of said sources.

The invention further aims to provide, a fuel cock assembly so constructed, as to overcome the objection present in assemblies having as elements thereof ported rotatable corked valve plugs.

The invention further aims to provide, a fuel cock assembly having normally closed fuel supply controlling elements, each for an independent fuel source, means releasably engaging with said elements for shifting one of them to and for positively holding same in open position for fuel supply, and with said elements so constructed and arranged to provide for the automatic closing thereof when released from said means.

The invention further aims to provide a fuel cock assembly having normally closed fuel supply controlling elements, each for an independent fuel source, and each being so constructed as to positively prevent leakage when closed.

The invention further aims to provide a fuel cock assembly common to a plurality of independent fuel sources, including a shiftable normally closed spring controlled poppet valve for each source and with the valve having a rotative action, when shifted to open position to compensate for unevenness in wear thereby insuring for a tight fit when seated to prevent leakage.

The invention further aims to provide, a fuel cock assembly common to a plurality of independent fuel sources, each controlled by a normally seated bodily shiftable spring controlled poppet valve and means for shifting the valve in a direction to unseat the latter and for imparting a rotative movement to the valve on the unseating of it.

The invention further aims to provide, a fuel cock assembly including normally closed fuel supply controlling elements possessing more efficiency and durability than the corked seated supply controlling elements now generally employed.

The invention further aims to provide, a fuel cock assembly for a series of independent fuel sources and including fuel supply controlling elements and rotatable shifting means for the latter, and with said elements and means so constructed and arranged to provide at all times for the ready shifting of the elements through said means.

The invention further aims to provide a fuel cock assembly common to a series of independent fuel sources, and with each of the sources being controlled by an automatically seating poppet valve.

The invention further aims to provide, in a manner as hereinafter set forth, a fuel cock assembly which is comparatively simple in its construction and arrangement, strong, durable, compact, quickly installed with respect to a series of independent fuel sources, thoroughly efficient in its use, conveniently and expeditiously controlled, readily assembled and comparatively inexpensive to manufacture.

Embodying the foregoing aims and to others which may directly or indirectly hereinafter appear, the invention consists of the novel construction, combination and arrangement of parts as will be more specifically referred to and illustrated in the accompanying drawings, wherein is shown an embodiment of the invention, but it is to be understood that changes, variations and modifications may be resorted to which fall within the scope of the invention as claimed.

In the drawings:

Figure 1 is an elevation looking towards the front end of the assembly,

Figure 2 is a side elevation,

Figure 3 is a section on line 3—3 Figure 1,

Figure 4 is a section on line 4—4 Figure 3,

Figure 5 is a section on line 5—5 Figure 3,

Figure 6 is a section on line 6—6 Figure 3,

Figure 7 is a fragmentary view in lengthwise section illustrating the form of poppet valve structure employed and showing the relation thereof to the unseating element therefor, Figure 8 is a detail in elevation showing the contour of the cam forming a part of the valve unseating element, Figure 9 is an elevation of the check plate looking towards one face thereof, and Figure 10 is a fragmentary view in elevation showing the keeper means for the latching members of the check plate.

The assembly shown is for use in connection with and is common to a plurality of independent fuel sources. The number of such sources may be as desired. As shown by way of example, the said assembly is so constructed as to be common to four independent sources of fuel, not shown. The assembly will be set up to include an independent valve of the poppet type for controlling the intake of fuel from each source to a fuel receiving chamber. The fuel receiving chamber, to be referred to is common to said sources and a fuel supply pipe leading to the motors.

The assembly generally indicated at 12 includes a horizontally disposed casting formed of an annular part 13 providing a fuel receiving chamber 14 having a rear end wall 15 and an open front. The rear end of part 13 is formed on its outer periphery with a set of spaced radially extending apertured flanges 16 for the passage of holdfast means, not shown for anchoring the assembly to a support. The front end of the part 15 has an outwardly directed annular flange 17 having its rear surface integral with spaced bosses 18 on the outer periphery of the part 15. The bosses 18 are formed with threaded openings 19 which register with spaced openings 20 formed in the flange 17. Detachably connected to the front end of part 13 is a closure structure 21 for the open front of chamber 14. The structure 21 includes spaced openings 22 which register with the openings 20. Extending through the openings 20, 22 and threadedly engaging with the walls of the openings 19 are holdfast means 23 for detachably connecting the structure 21 to the part 13 of the casting. The cover structure 21 will be more fully described hereinafter.

The end wall 15 of chamber 14 is formed with a circular row of spaced passages 24, 25, 26, 27 and 28. The passages 24, 25, 26, 27 constitute combined valve chambers and fuel inlets or intakes for the chamber 14. The opening 28 constitutes an outlet for the chamber 14 and is arranged between the passages 24 and 27. The forward face of end wall 15 axially thereof is provided with a socket 29 opening into chamber 14 and surrounded in spaced relation by the aforesaid row of passages.

The casting at its rear end includes a row of spaced hollow extensions 30, each opening at its forward end into one of the aforesaid passages. The extensions 30 which open into the passages 24, 25, 26 and 27 are adapted to have connected thereto fuel feed lines, not shown leading from the independent fuel sources not shown. The extension 30 which opens into the passage 28 is adapted to have secured thereto a fuel supply line, not shown leading to the motors not shown. The inner faces of the extensions 30, at their rear portions are threaded as at 31. The interior construction of the extensions 30 is such to provide for the feed and supply lines, when connected thereto to be divergently disposed with respect to the rear end of the casting.

Arranged within and extending from the passages 24, 25, 26 and 27 into the chamber 14 are tubular structures for slidably suspending spring controlled poppet valve structures 32 of like form. Each of said tubular structures 33 provides a combined guide and support for a valve stem and a seat for a valve head carried by the stem. Each poppet valve structure 32 includes a poppet valve 34, a valve stem 42 mounted on the stem. The valve, abutment 35 mounted on the stem. The valve, the stem and abutment are one unit or part. Each tubular structure 33 is in the form of a stationary sleeve 36 provided intermediate its ends with a partition 37 having a circular row of spaced openings 38 and an axial opening 39. The partition 37 has its rear face formed with an annular boss 40 providing a rearward continuation of the wall of opening 39. The front face of the partition 37 has integral therewith a forwardly directed tubular extension 41 providing a forward continuation of the wall of opening 39. The wall of opening 39, in connection with the boss 40 and extension 41 provide a guide for the stem 42 of valve 34 and also a means for slidably and rotatably supporting said stem 42. The sleeve 36 is formed intermediate its ends with an annular flange 44 on its outer periphery and a part 45 extending rearwardly from flange 44 and having its outer periphery threaded, as at 46. The rear portion of the inner face of part 45 is beveled to provide a valve seat 47. The valve head is indicated at 48 and is of disc-like form having its edge 49 beveled for engagement with seat 47 to close chamber 14 to a fuel source. The stem 42 has a reduced threaded rear end terminal portion 50, a threaded forward end terminal portion 51 and a shoulder 52 at the forward end of portion 50. The valve head 48 axially thereof is mounted on portion 50 and abuts shoulder 52. The portion 50 extends rearwardly from head 48 and carries a clamping nut 53 for binding the head against said shoulder. The stem 42 extends forwardly from the element 33 and through the abutment 35. The latter is in the form of a circular disc 54 and has an axial threaded opening 55 which engages with the threads on portion 51. The disc 54 has a forwardly extending collar 56 which is fixed, as at 57 to the stem portion 51. The abutment 35 is of greater diameter than valve head 48. The flange 44 seats in a rabbet 58 formed in the end wall 15 of chamber 14. The part 45 of sleeve 36 threadedly engages with the threads 59 on the inner face of an extension 30. The valve head 48 is normally held in closed position by a controlling spring 60 which surrounds stem 42 and is interposed between the partition 37 and the abutment 35.

The closure structure 21 comprises a circular plate 61 of a diameter for seating against flange 17. The rear face of plate 61 is formed with an annular centering flange 62 for bearing against the inner face of the part 13 of the casing. The plate 61 is formed with an axial opening 63 and an integral forwardly directed sleeve 64 having the rear portion of its inner face forming a flush continuation of the wall of opening 63. The outer periphery of sleeve 64 is threaded. The front portion 65 of the inner face of sleeve 64 is of greater diameter than the rear portion 66 thereof. The portions of different diameters of the inner face of sleeve 64 are connected together by a beveled shoulder 67. When the structure 21 is detachably connected to the open front of the part 13 of the casting, a packing means 68 is interposed between structure 21 and the casting.

The assembly includes a rotatable device 69 for controlling the opening of the valves 33 to selectively establish communication between a fuel source and chamber 14. The device also functions to releasably hold a valve 33 in open position for the desired period. The device 69 includes a shaft 70 which has its rear end journaled in a bushing 71 arranged in the socket 29. The shaft 70 is disposed axially of chamber 14 and is of a length to extend forwardly from the closure structure 21. The outer end terminal portion of shaft 70 has fixed thereto a collar 72 formed with a yoke-shaped extension 73 for receiving a suitable instrument, not shown for rotating shaft 70.

Fixed to shaft 70, bodily rotating with the latter and having its rear end abutting the forward end of bushing 71 is a shifter or device 74 for selectively opening the valves 33. The shifter 74 functions to bodily shift rearwardly the stem and head of a valve 33 to open the latter in a direction parallel to the axis of chamber 14. The shifter 74 further functions to rotate the stem and head of a valve 33 simultaneously with the shifting of the latter to open position. The shifter 74 also functions to releasably hold a valve 33 in open position for the period desired. The shifter 74 is what may be termed a cam-structure including a horizontally disposed nose 75 of segmental contour in plan extending rearwardly from the outer portion 76 of a carrier 77 and having a rounded and slightly beveled rear surface 78. The nose 75 when the shifter 74 is active rides against the outer surface of an abutment 35. The nose 75 moves in an arc and starts at its leading end to engage the said surface, as the leading half part of the nose continues to move, owing to its contour it will shift the abutment, stem and valve head inwardly against the action of spring 60 until the high part of the nose at the vertical center of the latter clears the said surface, at which time the spring 60 will move the abutment, stem and valve head rearwardly against the follower half of the nose as the follower half travels against the said surface. When the nose is riding across the abutment in contact with the latter, the spring 60 will coact with the nose in a manner to provide for the pressure of the contact of the nose with the abutment to be such to cause the abutment, stem and valve head to rotate simultaneously with the shifting thereof.

The carrier 77 also includes a rearwardly directed intermediate portion 79 and an inner portion 80 which is offset rearwardly with respect to portion 76. The latter and portion 79 are cutout to form an opening 81. The portion 80 includes a flanged forwardly open cup-shaped part 82 having its rear end 83 provided with an axial opening 84 and a rearwardly directed collar 85 having its inner face forming a rearward continuation of the wall of opening 84. The abutments of the valves 33 are arranged in the path of the nose 75. The collar 85 is secured to the shaft 70 by the pin 86 and abuts the bushing 71. Mounted on shaft 70 is sleeve 87, which at its rear abuts the rear end 83 of part 82, and at its forward end abuts a stationary flanged bushing 88 to be more fully referred to. The flange 89 of the part 82 is formed with spaced forwardly directed pins 90, which pass through openings 91, in a check plate 92 for coupling the latter to the carrier 77 for the purpose of causing the plate to bodily rotate with the carrier. The plate 92 is slidably mounted on the sleeve 87 and the pins 90. Surrounding the sleeve 87 and interposed between the rear end 83 of part 82 and the plate 92 is a coiled controlling spring 93 permanently tending to hold the plate 92 against the bushing 88. The plate 92 is formed with forwardly directed spaced radially disposed upset portions 94 providing latching members for a purpose to be referred to. The portions 94 are of less length than the diameter of plate 92 and have their inner ends flush with the wall of an axial opening 95 in the plate. The opening 95 is for the purpose of slidably mounting the plate on sleeve 87.

The bushing 88 is mounted in the opening 63 of plate 61 and its flange is indicated at 96. The bushing 88 extends forwardly into the sleeve 66 and has its forward end beveled, as at 97 to form a continuation of the shoulder 67. The flange 96 is arranged against the inner face of plate 61. The inner end of the bushing 88 is formed with a circular row of radially disposed grooves 98 which provide keepers for the latching members. The depressed portion 94 of plate 92 are of V-shaped cross section. The grooves 98 in cross sectional contour conform in shape to the cross sectional contour of the portions 94. Three latching members and five keepers are employed. The latching members and three selected keepers coact to latch the device 69 from movement and also for latching it to provide for the nose 75 to hold a valve 33 open for the desired period. The shaft 70 extends through the bushing 88, and forwardly of the latter a packing 99 is mounted about the shaft. A packing holding structure 100 is detachably connected to the sleeve 64.

The nose 75, when the device 69 is rotated for a part of a revolution will ride against an abutment of a valve 33 and shift the latter to open position to establish communication between the chamber 14 and a fuel source, and when the movement of the device 69 is retarded by the coaction of the latching members with certain of the keepers, the movement of the device is discontinued, and the valve 33 held in open position until device 69 is again rotated in a direction to have nose 75 clear the abutment whereby the valve 33 will automatically close. Any suitable index may be employed to set forth what particular keepers are employed, in connection with the latching members for latching the nose relative to each of the valves, and to enable the operator to determine the valve 33 which he desires to open or close.

Each of the valve heads is formed of front and rear disc-like sections of any suitable metallic material and an intermediate disc-like section of greater thickness than the said other sections. The intermediate section has its edge beveled to conform to the contour of the valve seat, and such intermediate section will be formed of any suitable material, other than cork possessing a characteristic to provide for a fuel seal tight seating when the valve head is closed.

What I claim is:

1. In a fuel cock assembly, a housing forming a fuel receiving chamber, a plurality of spaced rearwardly extending fuel intake passages opening at their forward ends into and disposed in radial relation with respect to the axis of said chamber, a rearwardly extending permanently opened fuel outlet passage opening at its forward end into said chamber, tubular extensions opening into the rear ends of said intake passages and adapted to be coupled to fuel feed lines and a tubular extension opening into the rear end of said outlet passage and adapted to be coupled to a fuel supply line leading to a point of consumption, a tubular structure correlated with and arranged in each inlet passage, said structures extending into said chamber and each having a part thereof forming an annular valve seat and a part disposed axially thereof providing a tubular combined guide and support, normally closed fuel supply controlling valve structures, each mounted in, slidably and rotatably supported by and extending forwardly and rearwardly from a tubular structure, each of said valve structures including a spring controlled shiftable valve head for coaction with said seat to close an intake passage, a stem extending forwardly from the head through a tubular guide and an abutment fixed on the forward end of the stem, and a rotatable device journaled in the housing and having a part thereof arranged in said chamber for wiping the abutments to open the valve structures, said housing and device having coacting parts for latching said device selectively during the rotation of the latter.

2. In a fuel cock assembly, a housing forming a fuel receiving chamber, a plurality of spaced rearwardly extending fuel intake passages opening at their forward ends into and disposed in radial relation with respect to the axis of said chamber, a rearwardly extending permanently opened fuel outlet passage opening at its forward end into said chamber, tubular extensions opening into the rear ends of said intake passages and adapted to be coupled to fuel feed lines and a tubular extension opening into the rear end of said outlet passage and adapted to be coupled to a fuel supply line leading to a point of consumption, a tubular structure correlated with and arranged in each inlet passage, said structures extending into said chamber and each having a part thereof forming an annular valve seat and a part disposed axially thereof providing a tubular combined guide and support, normally closed fuel supply controlling valve structures, each mounted in, slidably and rotatably supported by and extending forwardly and rearwardly from a tubular structure, each of said valve structures including a spring controlled shiftable valve head for coaction with said seat to close an intake passage, a stem extending forwardly from the head through a tubular guide and an abutment fixed on the forward end of the stem, a rotatable device journaled in said housing and including a nose of segmental contour arranged within said chamber for wiping the forward faces of the abutments to open the valve structures, and a bushing supported by the housing and encompassing a portion of said device, said bushing formed with an outwardly directed annular flange on its inner end, said flange and said device having coacting parts for latching said device selectively during rotation of the latter to maintain a valve structure open.

3. In a fuel cock assembly, a housing provided respectively with a fuel chamber, a plurality of spaced rearwardly extending fuel intake passages opening at their forward ends into and disposed radially with respect to the axis of said chamber, a rearwardly extending permanently opened fuel discharge passage opening at its forward end into said chamber, tubular extensions opening into the rear ends of said intake passages and adapted to be coupled to fuel feed lines and a tubular extension opening into the rear end of said discharge passage and adapted to be coupled to a fuel supply line leading to a point of consumption, a normally closed fuel supply controlling valve structure mounted in each intake passage, extending into said chamber and including a stationary combined support and valve seat forming element and a spring controlled normally inactive axially bodily shiftable rotatable part slidably mounted in said element having a valve head, a valve stem and an abutment, the controlling spring for said part being located between the said abutment and element, and rotatable means operating in said chambers and having a laterally disposed means arranged so as to wipe one face of said abutments adjacent their peripheries for selectively shifting said parts rearwardly to open said structures and for partially rotating said parts simultaneously with the rearward shifting thereof.

4. In a fuel cock assembly, a housing provided respectively with a fuel chamber, a plurality of spaced rearwardly extending fuel intake passages opening at their forward ends into and disposed radially with respect to the axis of said chamber, a rearwardly extending permanently opened fuel discharge passage opening at its forward end into said chamber, tubular extensions opening into the rear ends of said intake passages and adapted to be coupled to fuel feed lines and a tubular extension opening into the rear end of said discharge passage and adapted to be coupled to a fuel supply line leading to a point of consumption, a normally closed fuel supply controlling valve structure mounted in each intake passage, extending into said chamber and including a stationary combined support and valve seat forming element and a spring controlled normally inactive axially bodily shiftable rotatable part slidably mounted in said element having a valve head, a valve stem and an abutment, the controlling spring for said part being located between the said abutment and element, and a rotatable device journaled in the housing and including a laterally disposed carrier operating in said chamber and having a laterally disposed nose of segmental contour arranged so as to wipe one face of said abutments adjacent their peripheries for selectively shifting said parts rearwardly to open said structures and for partially rotating said parts simultaneously with the rearward shifting thereof.

5. In a fuel cock assembly, a fuel receiving chamber having spaced intakes and a permanently opened outlet, a normally closed spring controlled valve structure arranged in each intake and including a stationary combined support and valve seat forming element and an axially bodily movable rotatable spring controlled part slidably mounted in said element, said part including an abutment and a valve head, said valve head for correlation with said seat, connected to and spaced rearwardly from said abutment, said abutment positioned in said chamber, and a rotatable carrier operating in said chamber and provided at its outer end with a radially disposed arm terminating into a rearwardly directed nose of segmental contour arranged so as to wipe one face of said abutments adjacent their peripheries for selectively shifting them rearwardly to open the valve structures and to provide for the partial rotation of the valve heads and abutments in unison on the rearward shifting of the latter.

6. In a fuel cock assembly, a housing forming a fuel receiving chamber, a plurality of spaced normally closed fuel passages for opening into said chamber, spaced tubular extensions, each forming an outward continuation of a passage, a tubular structure correlated with and arranged in each passage, said structures being secured to the walls of said passages, extending into said chamber and each having as a part thereof a combined support and annular valve seat forming element, a spring controlled valve structure slidably and rotatably suspended by each of said elements, each valve structure including a valve head normally engaging said seat for closing a tubular structure and its correlated passage and including an abutment positioned in said chamber, spaced from, connected to and correlated with said valve head, and a rotatable device journaled in said housing axially of the latter and having a radially extending part disposed in said chamber, said part terminating at its outer end in a rearwardly directed nose arranged so as to wipe one face of said abutments adjacent their peripheries for selectively shifting an abutment and its correlated valve in a direction to open a tubular structure and the correlated passage for the latter and for simultaneously partially rotating said valve on the said shifting of the said valve.

GEORGE T. DOWNEY.